United States Patent [19]
Zschocke

[11] Patent Number: 4,673,050
[45] Date of Patent: Jun. 16, 1987

[54] FLUID-OPERATED TRANSPORTING CRAWLER-TYPE TRACK

[75] Inventor: Christian Zschocke, Erdmannsdorf, German Democratic Rep.

[73] Assignee: Akademie der Deutschen Demokratischen Republik, Berlin, German Democratic Rep.

[21] Appl. No.: 772,872

[22] Filed: Sep. 4, 1985

[30] Foreign Application Priority Data

Sep. 5, 1984 [DD] German Democratic Rep. ... 267122

[51] Int. Cl.$^4$ .......................... B62D 55/08; B60V 1/00
[52] U.S. Cl. ...................................... 180/9.1; 180/125; 305/14; 305/34
[58] Field of Search ................... 180/9.1, 125; 305/14, 305/34

[56] References Cited

U.S. PATENT DOCUMENTS

| | | | |
|---|---|---|---|
| 3,074,499 | 1/1963 | Bertelsen | 305/14 X |
| 3,074,764 | 1/1963 | Bertelsen | 305/14 X |
| 3,261,418 | 7/1966 | Bertin | 180/9.1 |
| 3,512,602 | 5/1970 | Bertelsen | 180/9.1 |
| 3,950,038 | 4/1976 | Wood | 180/125 X |
| 4,567,957 | 2/1986 | Johnson | 180/125 |

FOREIGN PATENT DOCUMENTS

| | | |
|---|---|---|
| 2329727 | 3/1974 | Fed. Rep. of Germany . |
| 2149388 | 3/1973 | France . |
| 2164021 | 7/1973 | France . |

*Primary Examiner*—John A. Pekar
*Attorney, Agent, or Firm*—Michael J. Striker

[57] ABSTRACT

In a crawler-type track, an endless flexible belt is stretched over a stator which includes fluid-receiving pressure-tight cells and is formed with a central fluid collecting tank connected to a revolving pump. The cells of the stator are supplied with pressure fluid via the channels or passages formed in the stator. The belt is radially spaced from the stator so that a gap, formed therebetween, is filled with pressure fluid. The belt is provided with an inner slide layer also formed with fluid-receiving cells. The fluid-containing system is enclosed in a pressure-tight circuit.

7 Claims, 15 Drawing Figures

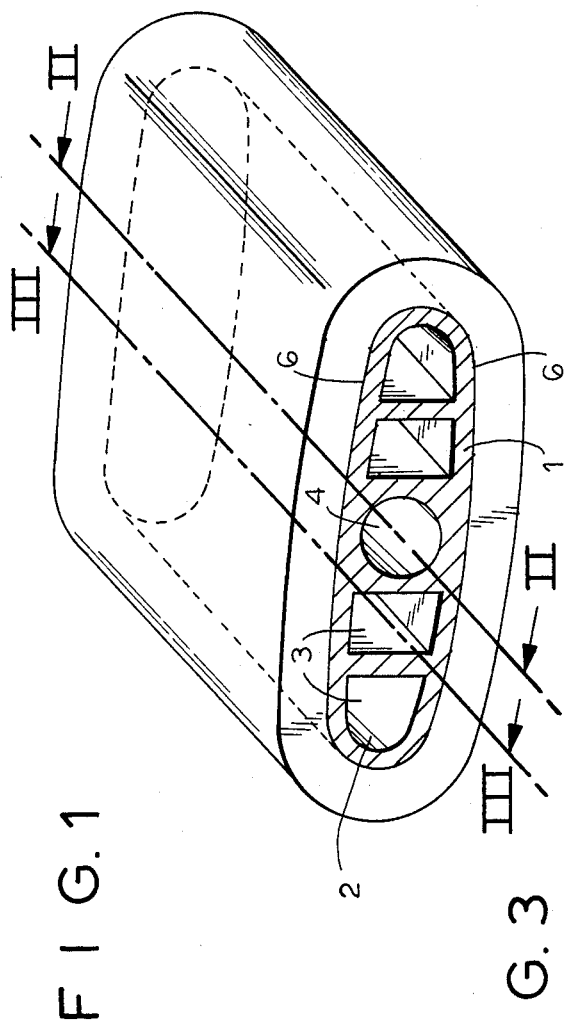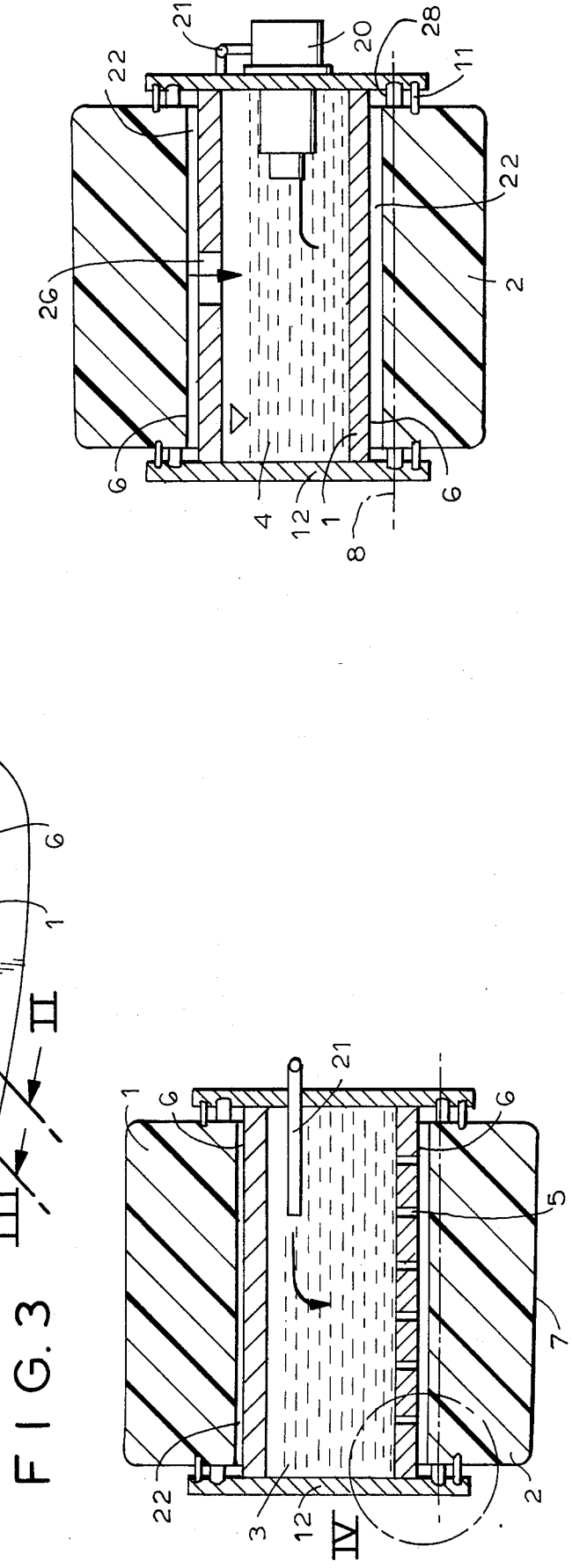

FIG. 10.1
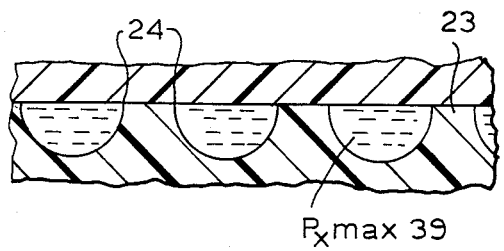
FIG. 10.2
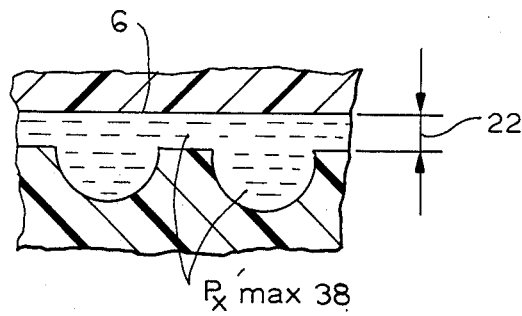
FIG. 10.3
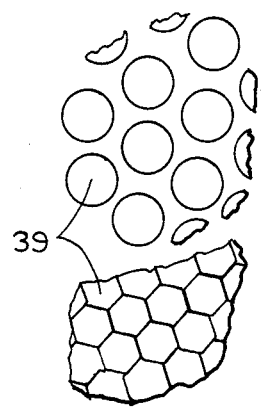

FLUID-OPERATED TRANSPORTING CRAWLER-TYPE TRACK

BACKGROUND OF THE INVENTION

The present invention relates to a fluid transporting crawler-type track which is utilized preferably for a heavy assembly transport at short intervals. While constructing the endless flexible tracks and defining their operation principle small masses and dimensions of such endless flexible tracks must be taken into consideration even when high loads are to be transported. Various structures for various objects or aggregates have been suggested in the "piggyback" methods.

Crawler-type track vehicles, endless flexible drive-carrying construction work machines and endless flexible-heavy load-conveyors have been known in the "piggyback" technology.

The constructional principle of such endless flexible tracks has been based on the multiple arrangement of the carrier wheels, track wheels and drive wheels by means of which the endless belt stretched from the links is driven. Therefore the high bottom pressure is converted into the lower load-distributing surface pressure. The running and supporting wheels roll on the endless flexible track and thus advance the vehicle.

The links of the endless flexible track are subject to high mechanical loads. Due to the bottom contact the chain or belt of the crawler-type track is subject to substantial wear. With quickly-travelling vehicles service life and constructive consumption depend on the wear of the chain or belt of the track. The entire force transmission is obtained by the wheel system with a required dimensioning of this system, including wheels, bearings, frames and the endless track. A spacious arrangement of the structural groups of the endless track vehicle is defined by the construction principle. Mainly all caterpillar-type vehicles are heavy constructions.

Also known, have been crawler-type vehicles, provided with air cushions. One or more air cushions have been enclosed by the endless belt and the inner surface of the track has formed a slide surface of the air cushion. Such vehicles have been described, for example in DE-OS No. 2,329,727 and FR No. 2,164,021.

In the known devices, the air cushion loaded by the endless belt technically is not dominated for high side forces from a cross drift and a steering lock. The required sensibility for the air cushion is however insufficient when the endless belt, released from the links, has unevenness at its bottom and the function of the air cushion is disturbed.

A transporting vehicle of the foregoing type is also described in FR No. 2,149,388. In this transporting vehicle the rubber endless belt is moved on the track chassis. The chassis is arranged so that it air-tightly and pressure-tightly surrounds the ground surface of the vehicle and the space before the bottom surface is free so that an air cushion can be formed in that space. The air cushion is supported by the supporting plate of the vehicle, the transporting track and the chassis which encloses the air cushion at all the sides thereof.

The utilization of such a transporting device requires a stable and totally smooth and even track. The horizontal movement is obtained by the additional pulling and braking arrangements.

SUMMARY OF THE INVENTION

It is an object of the present invention to provide an improved fluid-operated transporting endless flexible track.

It is another object of this invention to expand the technological application of the high-pressure fluid transportation technique to the transportation of high loads, without requiring the utilization of slide tracks and the use of the additional or auxiliary means for the pulling and braking devices.

The utilization of a fluid-supporting gap in the transporting vehicles of this type must clearly shift the proportion of the specific mass of the transportation means to the transport means in the direction of a smaller transport means mass. By the reduction of the dimensions of the transporting device its adaptability to an object to be transported can be substantially improved.

Possibilities of the utilization of the endless flexible tracks are substantially advanced and energy consumption is reduced as well as total costs of assembling and manufacturing due to the flexible track of this invention.

These and other objects of the invention are attained by a fluid-operated transporting endless flexible track comprising a bending-resistant and torsion-resistant stator; an endless, flexible and a fluid-and-pressure tight belt corresponding in shape to that of said stator and stretched over an entire width of said stator, said stator including fluid-receiving and fluid-transmitting pressure-tight cells and passages uniformly distributed over the width of said stator, said passages connecting said cells with a bottom-side slide surface of said stator, said belt and said stator being spaced from each other to form therebetween a gap which admits the fluid, said stator being formed with a collecting tank centrally positioned in said stator and with an inlet opening which connects said tank with said gap; side walls tightly enclosing said stator at the sides thereof and being of the length smaller than the thickness of said belt, said belt having a slide layer facing said stator and formed of hydrostatic cells, said hydrostatic cells being open towards said stator and having elastic cell walls; a non-rigid reinforcements inserted in said belt and provided with lateral support elements extended outwardly from said belt; a roller chain supported on said support elements; wheel disks adapted to rotate said belt and positioned outside of said stator at two sides thereof; and a drive aggregate for driving said discs, said belt being at two sides thereof fluid-tightly connected to said side walls.

In the present invention, the object of the invention is solved by that the crawler-type vehicle is provided with an elastic carcass and a fluidic supporting system without a wheel-supporting system.

The endless flexible track of this invention has small construction masses and provides for a hermically closed device of small dimensions.

The vehicle is self-propelling and maneuverable and does not require slide tracks or specific devices for various transporting paths.

A closed pressure fluid circuit is formed in the endless flexible track by a pressure-tight system; the track further including a revolving pump and a feeding conduit connected thereto; said pump, said tank, said feeding conduit, said pressure-tight cells, said passages, said gap and said inlet opening constituting said system.

The pressure-tight cells may be concentrated in lateral end zones of said slide layer.

Th slide layer of the flexible endless belt may be wear-resistant and has a homogenous cell structure. The slide layer may be honeycomb-shaped, said cell walls having lips at said upper surfaces.

With the smooth outer surface of the stator a uniform hydrostatic fluid gap is obtained. If unevenness occurs on the bottom surface during the travel of the flexible track local pressure peaks then occur between the elastic caterpillar belt and the stator. The fluid contained in the hydrostatic cells takes up, with only little deformation, an insignificant compressibility of the pressure. The lips of the cell walls frictionally slide as sealing elements on the smooth outer surface of the stator. The sealing arrangement of the hydrostatic cells during the movement of the belt relative to the stator compensates for pressure peaks caused by the unevenness of the bottom surface. If the crawler-type element has the unevenness crossed the corresponding cells are hydrostatically unloaded.

The fluid released from the gap in the longitudinal and horizontal directions is, after flowing along the upper surface of the stator displaced, then flows through the inlet opening back into the collecting tank and is again fed into the closed circuit via the revolving pump.

The load-reception takes place in the center of the stator by the stationary or movable axle.

Two crawler-type members may be provided with a differential drive and run in parallel as a single unit.

The fluid may be hydraulic oil, emulsions or water.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view of a endless flexible element without a lateral cover;

FIG. 2 is a sectional view taken along line II—II of FIG. 1;

FIG. 3 is a sectional view taken along line III—III of FIG. 1;

FIG. 10.1 is a detail Y of FIG. 10; FIG. 10.2 is a detail X of FIG. 10;

FIG. 10.3 shows an interior of the upper surface structure of the tape of the track;

DETAILED DESCRIPTION OF THE PREFERRED EMBODIMENTS

Figure 12:
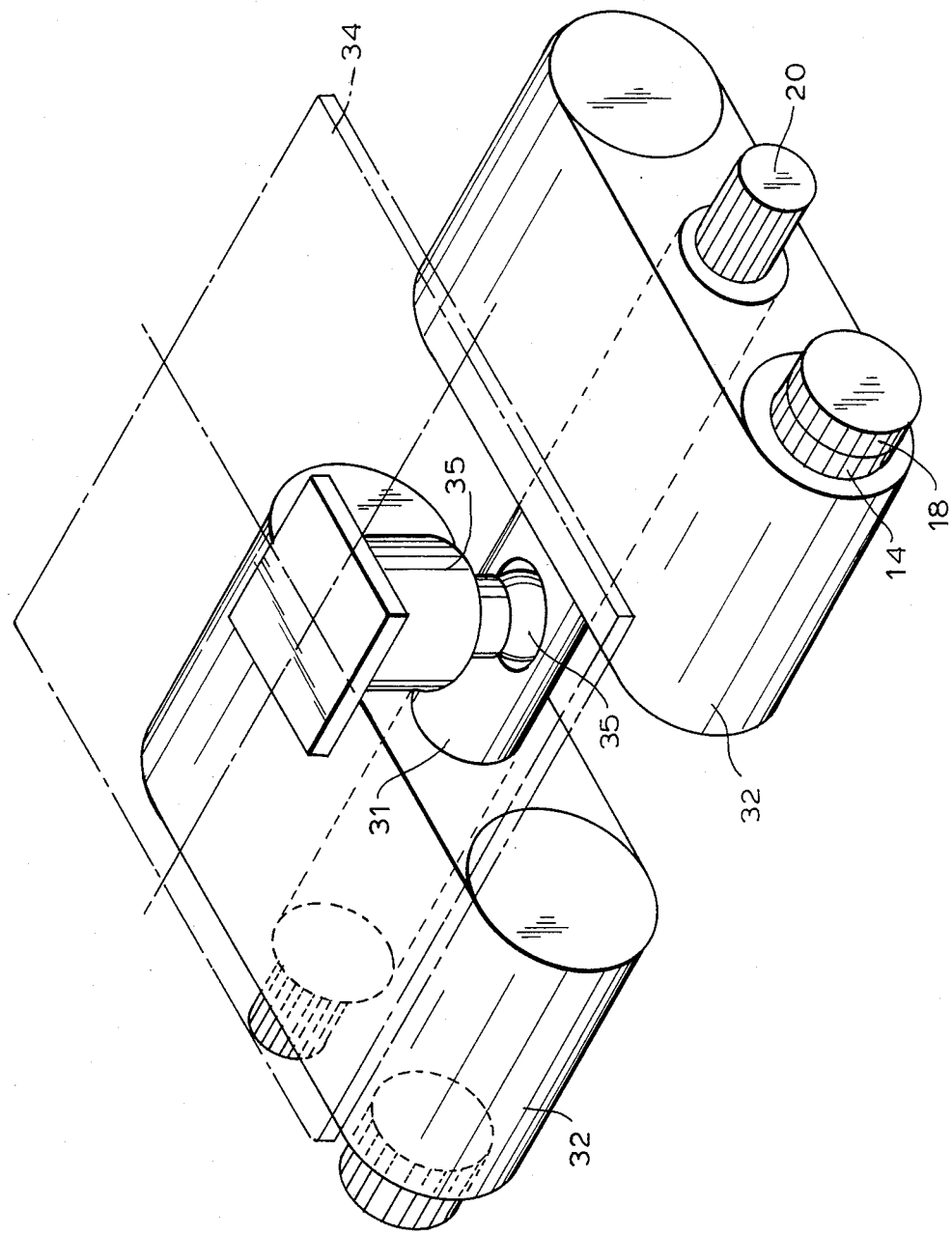
FIG. 12 is a perspective view of the fluid-transporting endless track with an electrical drive aggregate.

Referring now to the drawings in detail, it will be seen that an endless flexible belt of homogenous or cell-type structure of rubber or rubber-like material is stretched over a stator 1 in the form of a crawler-type element or body 32 (FIGS. 1 and 12). The stator which is a supporting structural component of the device is subdivided into pressurized cells 3, 4 which are in connection with a slide surface 6 of the stator 1 via passages 5.

Passages 5 are distributed over the width of the bottom side of the stator 1. These passages are concentrated on the both sides in the end zones of the bottom side or wall. Less passages are arranged in the middle region of the bottom wall.

The endless flexible belt 2 has a layer of wear-resistant and elastic material which has a bottom surface 7. A rigidity carrier 8 is positioned in the interior of the belt 2. Carrier 8 is comprised of the insert or filler of a known reinforcement steel wire net or a chain belt. The carrier 8 is imbedded in elastic material of the belt whereby the insert is arranged near the inner slide layer 9.

Figure 5:
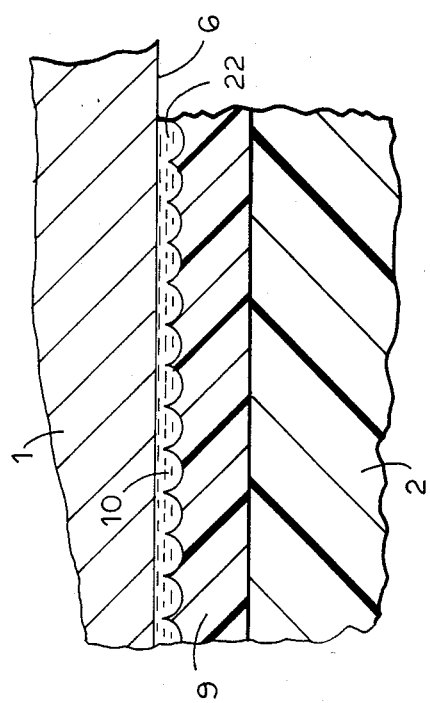
FIG. 5 is a detail V of FIG. 4.
Figure 10:
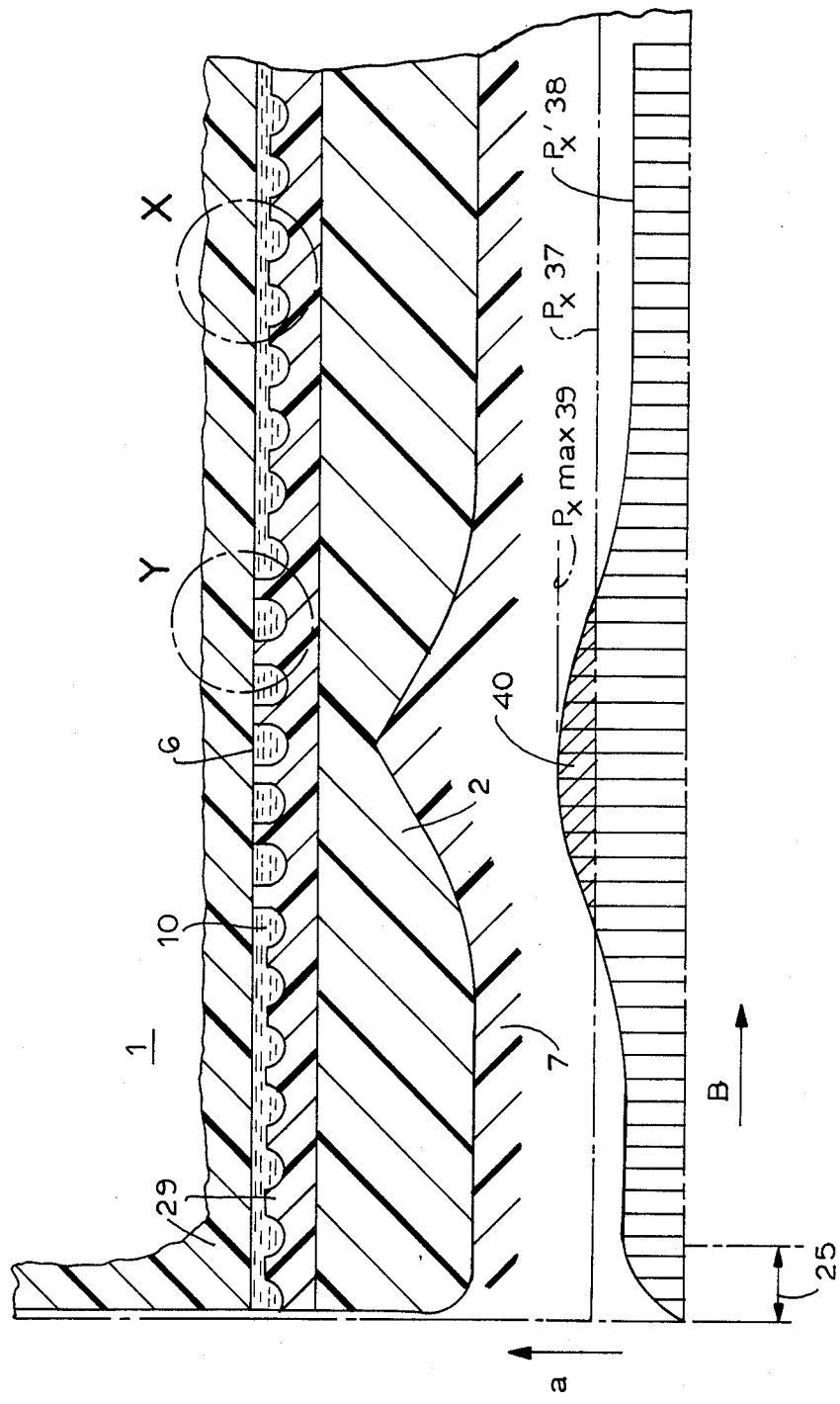
FIG. 10 is a schematic view illustrating the operation principle of hydrostatic cells.

The slide layer 9 of the endless flexible belt includes an upper surface structurally subdivided into individual cells 10 as shown in FIG. 5. Cells 10 can be preferably of honeycomb or cup-shaped structure 36 as shown in FIG. 10.3. The carrier 8 is supported in the belt 2 relative to side walls 12 by means of two metallic support elements 11 at two sides of the carrier 8.

These support elements 11 extend outwardly at two sides o the belt 2. The projecting ends of these elements 11 are formed at rollers (FIG. 4) guided in recesses provided in the side walls 12.

Figure 7:
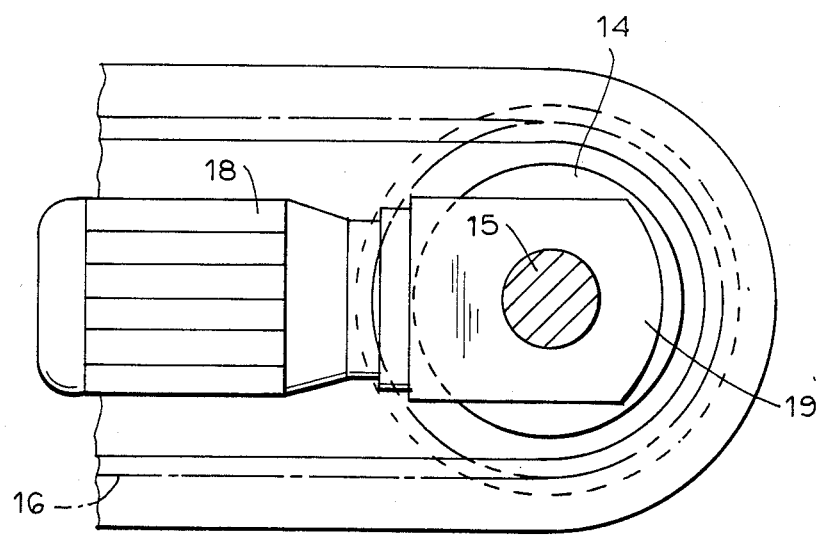
FIG. 7 is a partial view of the drive of the element of FIG. 1.
Figure 8:
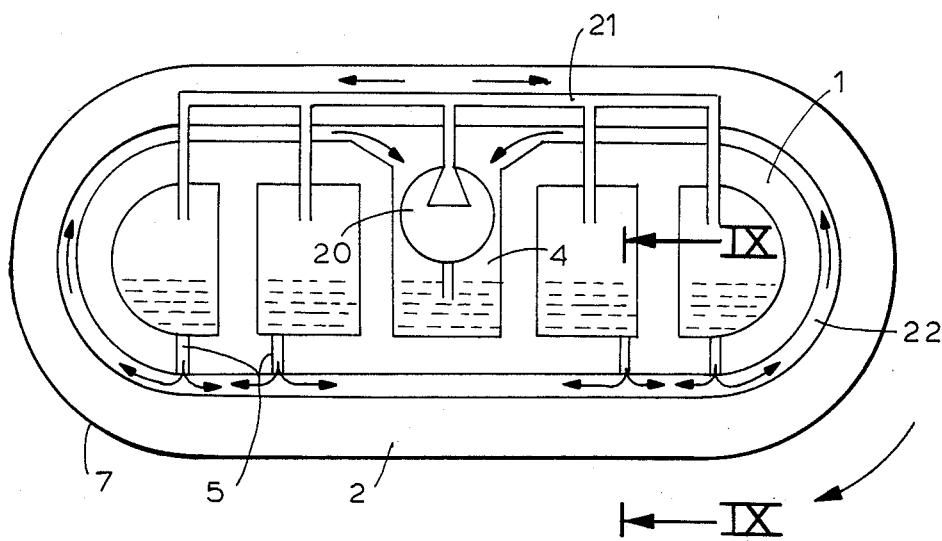
FIG. 8 is a schematic view of a fluid circulation.

The drive of the endless flexible belt 2 is obtained preferably by means of wheel disks 14 (FIGS. 7 and 12) positioned outside the belt and not participating in the supporting action. Wheel disks 14 are connected to a drive shaft 15 and are adapted to drive the belt 2 via a roller chain 16 formed by support elements 11.

Figure 4:
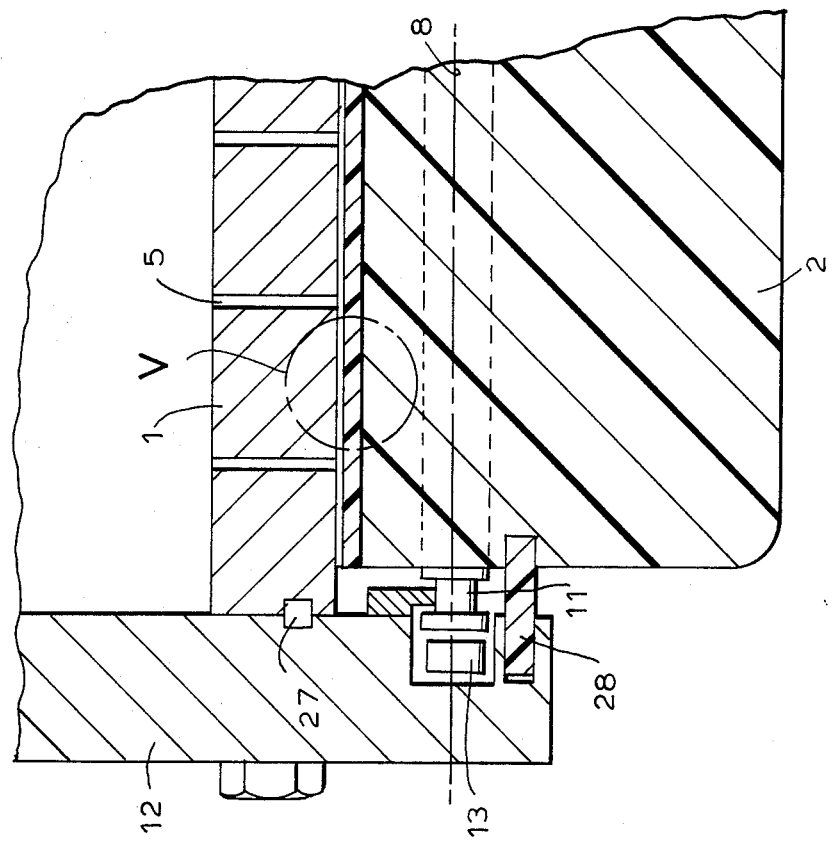
FIG. 4 is a detail IV of FIG. 3.
Figure 6:
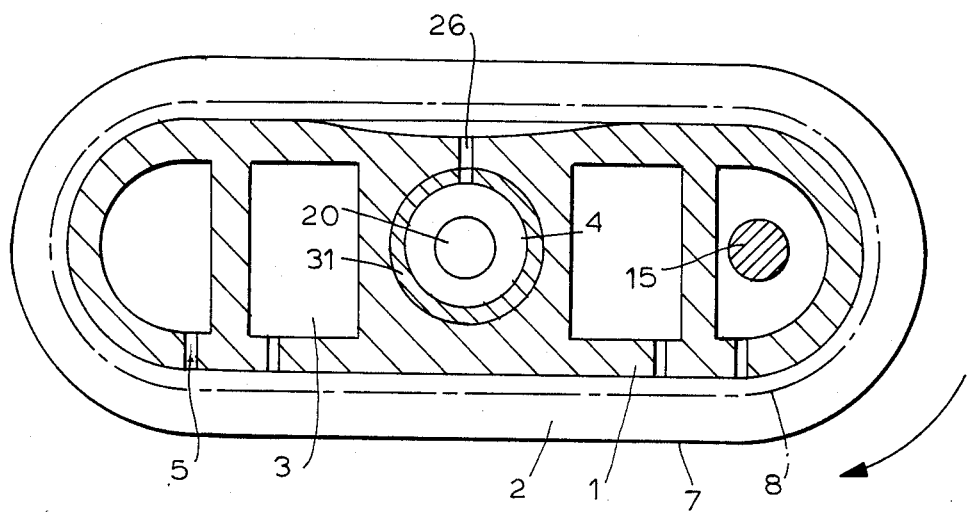
FIG. 6 is an axial sectional view through the element of FIG. 1.

The roller chain 16 is supported by a strip 17 (FIG. 4). A drive aggregate 18 shown in FIGS. 7 and 12 drives the wheel disks 14 via a transmission 19. The drive aggregate 18 can be a customary electric motor while transmission 19 can be also of any suitable conventional type.

Figure 9:
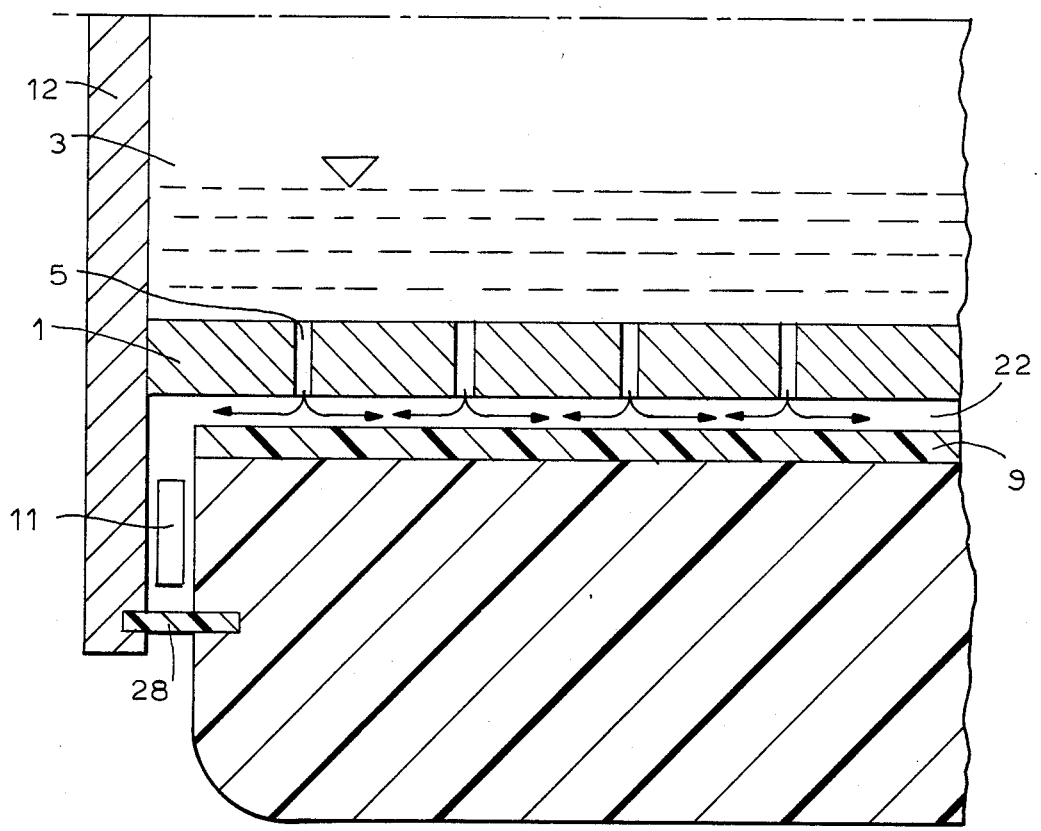
FIG. 9 is a schematic view of the section taken along line IX—IX of FIG. 8.

A pressurized fluid, which is required for the function of the fluid-transporting crawler-type track, is fed into cells 3 of the stator 1 via a revolving pump 20, tubular conduits 21 and passages 5 for filling a hydrostatic fluid gap 22 as shown in FIGS. 3 and 9. The hydrostatic cells 10 of the inner slide layer 9 are also filled thereby.

With reference to FIG. 10 it will be seen that hydrostatic pressure 37 of the system inside the cells 3 insignificantly exceeds quotients of the entire weight of the device and the object being transported to the supporting surface. It is reduced in the passage 5 to a relative pressure 38. The hydrostatic gap 22 formed between the stator 1 and the caterpillar belt 2 is maintained as long until no unevenness occur at the both sides. Upon the occurrence of unevennesses local pressure peaks occur, during the movement of the crawler-type track, between the elastic caterpillar belt 2 and stator 1.

The fluid enclosed in the hydrostatic cells 10 takes up this pressure only with an insignificant deformation of the cell walls 23 and a little compressibility. This results in a local maximal pressure 39.

Each cell wall has a lip 24 which frictionally slides as a sealing element on a smooth outer surface of the stator 1. The sealing arrangement of the hydrostatic cells during the translation of the endless belt 2 to the stator 1 compensates for pressure peaks 40 caused by the unevenness of the bottom surface 7. The cells 10 are firstly hydrostatically relieved when the crawler-type track has unevenness crossed.

The fluid flowing from the hydrostatic gap 22 in the longitudinal and transversal directions (FIG. 2) is dislodged to the outer side of the stator 1, then flows via opening 26 into the collecting tank 4 and is then again fed into the circuit by the pump 20.

The operation principle of hydrostatic cells ensures a required pressure built-up with little fluid losses in an edge zone 25 transversely of the direction of course at a very short distance and in the direction of course around the contour of the stator.

Figure 11:
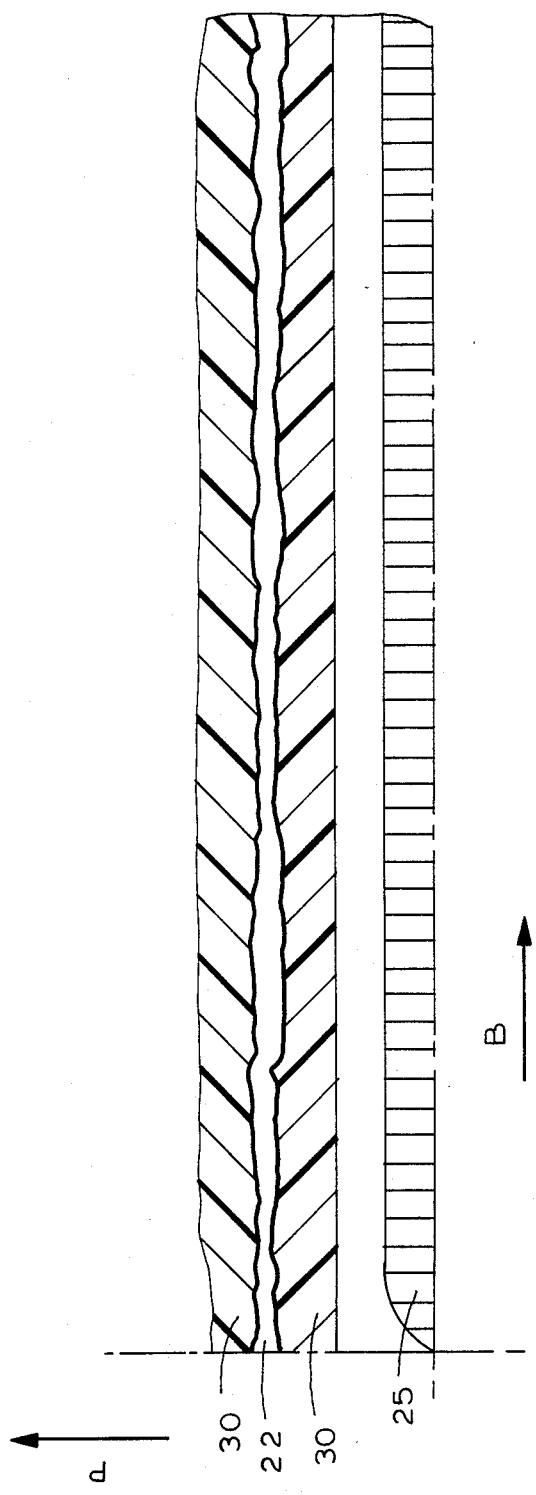
FIG. 11 is a representation of a known hydrostatic bearing with the pair of hard materials.

The operation principle of hydrostatic cells 10 is shown in FIGS. 10 and 11 for the material pair including a hard surface and an elastic surface 29 in comparison with the known hydrostatic bearing of two rigid elements 30 with comparatively smooth outer surfaces. In the load zone with an increased pressure strain 40 at the bottom side generated by the waviness of the bottom surface 7 the homogeneous fluid gap 22 is interrupted and lips 24 of the cells walls 23 come into contact with the hard slide surface 6 of the stator 1 and a progressive fluid draining from the cells 10 is prevented. Thereby an equivalent pressure 39 builts up in the cells 10, which pressure is substantially higher than the middle pressure 37, 38 in the remaining pressure system. Each lip 24 proportionally develops a predetermined pressure interval in accordance with a geometric contour of the construction.

The load reception takes place in the center of the stator 1 by a movable axle 31. Thus there is a possibility that the revolving pump 20 would be accommodated in the interior of the hollow axle.

In the case of the arrangement of two crawler-type elements 32 running in parallel and provided with a differential drive of the known type the system is controllable in the known fashion.

The central arrangement of the hydraulic stroke cylinder 33 increases the application range of this device. An object being transported or a turnable loading table 34 can be secured to the flange plate of the cylinder 33 as shown in FIG. 12. The pivotal movement of the hydraulic cylinder 33 is effected in the axle, preferably with a ball joint 35.

Oil, emulsions or water can be used as working fluid in the device of this invention.

It will be understood that each of the elements described above, or two or more together, may also find a useful application in other types of fluid-transporting crawler-type elements differing from the types described above.

While the invention has been illustrated and described as embodied in a fluid-transporting crawler-type track, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fluid-operated transporting crawler-type track, comprising a bending-resistant and torsion-resistant stator; an endless, flexible and a fluid-and-pressure-tight belt stretched over an entire width of said stator, said stator including fluid-receiving and fluid-transmitting pressure-tight cells and passages uniformly distributed over the width of said stator, said passages connecting said cells with a bottom-side slide surface of said stator, said belt and said stator being spaced from each other to form there-between a gap which admits the fluid, said stator being formed with a collecting tank centrally positioned in said stator and with an inlet opening which connects said tank with said gap; side walls pressure-tight enclosing said stator at the sides thereof and being of the length smaller than the thickness of said belt, said belt having a slide layer facing said stator and having an outer surface facing said stator, formed of hydrostatic cells, said hydrostatic cells being open towards said stator and having elastic cell walls; non-rigid reinforcements inserted in said belt and connected with lateral support elements extended outwardly from said belt and forming a roller chain supported in a side wall of said stator; wheel disks engaged with said roller chain so as to rotate said belt and positioned outside of said stator; and a drive aggregate for driving said disks, said belt being at two sides thereof fluid-tightly connected to said side walls.

2. The track as defined in claim 1, further comprising a pressure-tight system which includes a revolving pump, a feeding conduit connected thereto and also said tank, said pressure-tight cells, said passages, said gap and said inlet opening.

3. The track as defined in claim 1, wherein said slide layer of said flexible belt is wear-resistant.

4. The track as defined in claim 1, wherein said outer surface of said slide layer is honeycomb-shaped, said cell walls having lips at surfaces thereof.

5. The track as defined in claim 1; further including a load-registering axle positioned centrally of said stator.

6. The track as defined in claim 1, wherein two crawler-type members, provided with a differential drive, run in parallel as a single unit.

7. The track as claimed in claim 1, wherein said fluid is hydraulic oil, emulsions or water.

* * * * *